United States Patent [19]
Metcalf

[11] Patent Number: 4,605,234
[45] Date of Patent: Aug. 12, 1986

[54] MECHANICAL SEAL ASSEMBLY WITH ORIENTATION MAINTAINING MEANS

[76] Inventor: Maurice E. Metcalf, 1028 Avenue E, Nederland, Tex. 77627

[21] Appl. No.: 808,943

[22] Filed: Dec. 16, 1985

[51] Int. Cl.⁴ ............................................. F16J 15/34
[52] U.S. Cl. .................................. 277/81 R; 277/82; 277/85; 277/93 SD
[58] Field of Search .................. 277/81 R, 82, 85, 92, 277/93 R, 93 SD, 38–41

[56] References Cited

U.S. PATENT DOCUMENTS

| | | | |
|---|---|---|---|
| 2,240,252 | 4/1941 | Bernstein | 277/39 |
| 2,738,208 | 3/1956 | Mylander | 277/81 X |
| 3,322,430 | 5/1967 | Voitik | 277/41 |
| 3,479,039 | 11/1969 | Pinkas | 277/30 |
| 4,136,887 | 1/1979 | Wentworth, Jr. | 277/43 |
| 4,277,072 | 7/1981 | Forch | 277/85 X |
| 4,342,538 | 8/1982 | Wolford et al. | 277/82 X |
| 4,391,450 | 7/1983 | Beck | 277/1 |
| 4,406,462 | 9/1983 | Witten | 277/93 SD |

FOREIGN PATENT DOCUMENTS 777300  11/1980  U.S.S.R. ............................ 277/81 R

*Primary Examiner*—Robert S. Ward
*Attorney, Agent, or Firm*—Donald A. Kettlestrings

[57] ABSTRACT

A mechanical seal assembly for use with a rotatable shaft passing through a housing wherein the assembly includes a flowable material filled ring member acting in cooperation with a stationary sealing member and a sealing member positioned around the shaft to maintain the sealing members in fluid-tight sealing relationship with each other.

13 Claims, 5 Drawing Figures

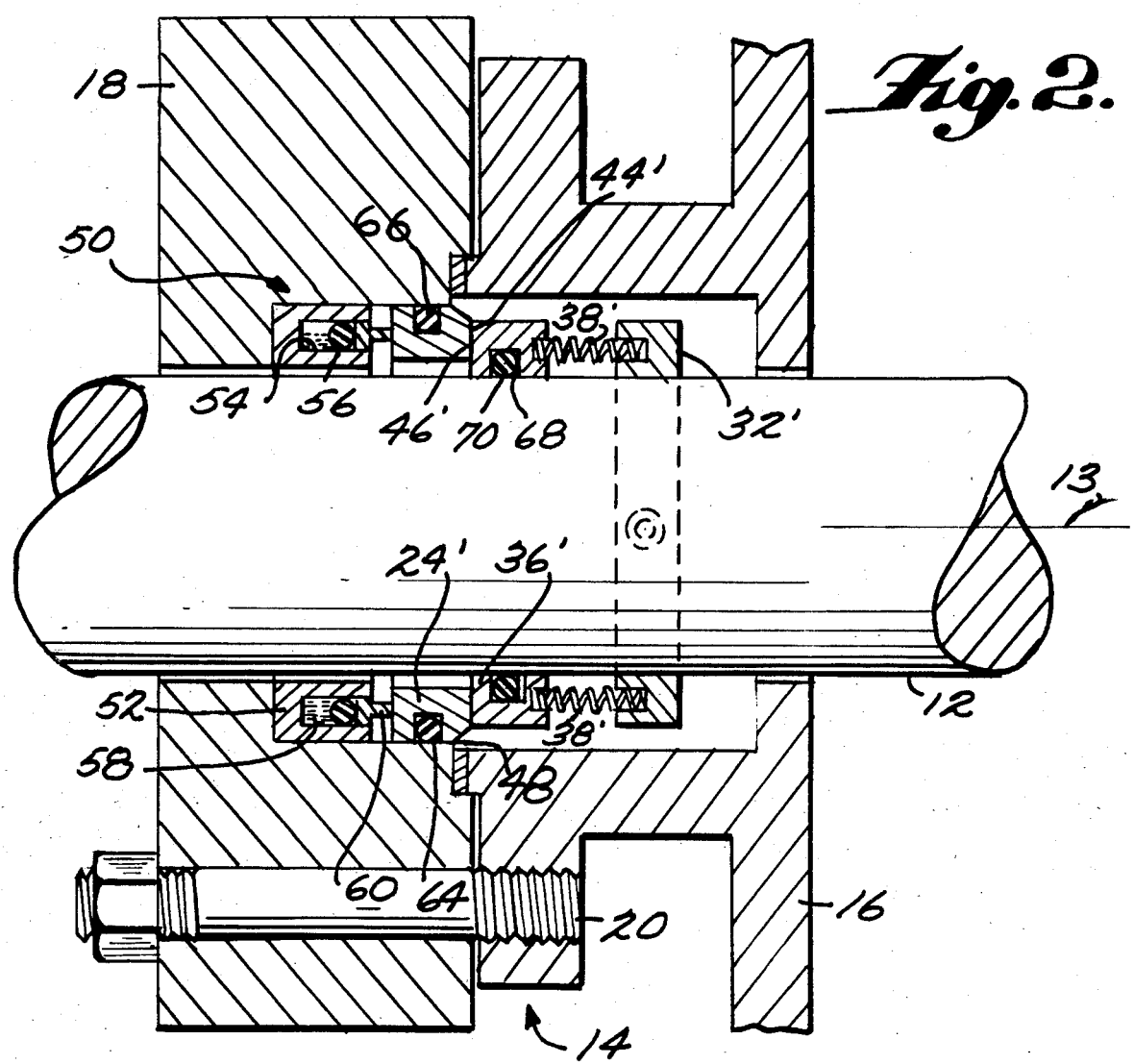

MECHANICAL SEAL ASSEMBLY WITH ORIENTATION MAINTAINING MEANS

This invention relates to a mechanical seal assembly and more particularly to such an assembly for use with a rotatable shaft passing through a housing wherein wear or fretting of the shaft is eliminated and wherein wear of seal members within the assembly is reduced.

Various types of seal assemblies are known, but these assemblies have not proved entirely satisfactory under all conditions of service because of undesirable wear on the shaft and sealing members.

It is, therefore, an object of the present invention to provide a mechanical seal assembly for use with a rotatable shaft passing through a housing which eliminates wear on the shaft.

Another object is to provide such a seal assembly which reduces the wear on seal members of the assembly.

A further object of the invention is the provision of such an assembly which maintains and improves the seal notwithstanding distortion of the shaft.

Yet another object of the present invention is the provision of such an assembly wherein sealing members within the assembly are automatically maintained in optimum sealing relationship with each other as the shaft is rotated.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides a mechanical seal assembly for use with a rotatable shaft passing through a housing, the seal assembly comprising: a first ring member attached to and rotatable with the shaft; a first annular seal member positioned in fluid-tight contact around and rotatable with the shaft; at least one spring member yieldingly connected between the ring member and the seal member; a second annular seal member positioned within the housing in spaced relationship from and around the shaft and in fluid-tight relationship with the housing and with the first seal member: and flowable material filled means in operative relationship with the housing and with the second seal member for cooperating with the first seal member to enable the second seal member to be maintained in a predetermined orientation with respect to the shaft.

It is to be understood that both the foregoing general description and following detailed description are exemplary and explanatory but are not restrictive of the invention.

The accompanying drawings which are incorporated in and constitute a part of this specification, illustrate an example of a preferred embodiment of the invention and, together with the description, serve to explain the principles of the invention.

FIG. 2 is a view, partly in cross section, showing one embodiment of the improved seal assembly of this invention;

FIG. 3 is an enlarged fragmentary cross-sectional view of a subassembly of this invention;

FIG. 4 is an enlarged fragmentary cross-sectional view of an alternative subassembly of this invention.

Figure 1:
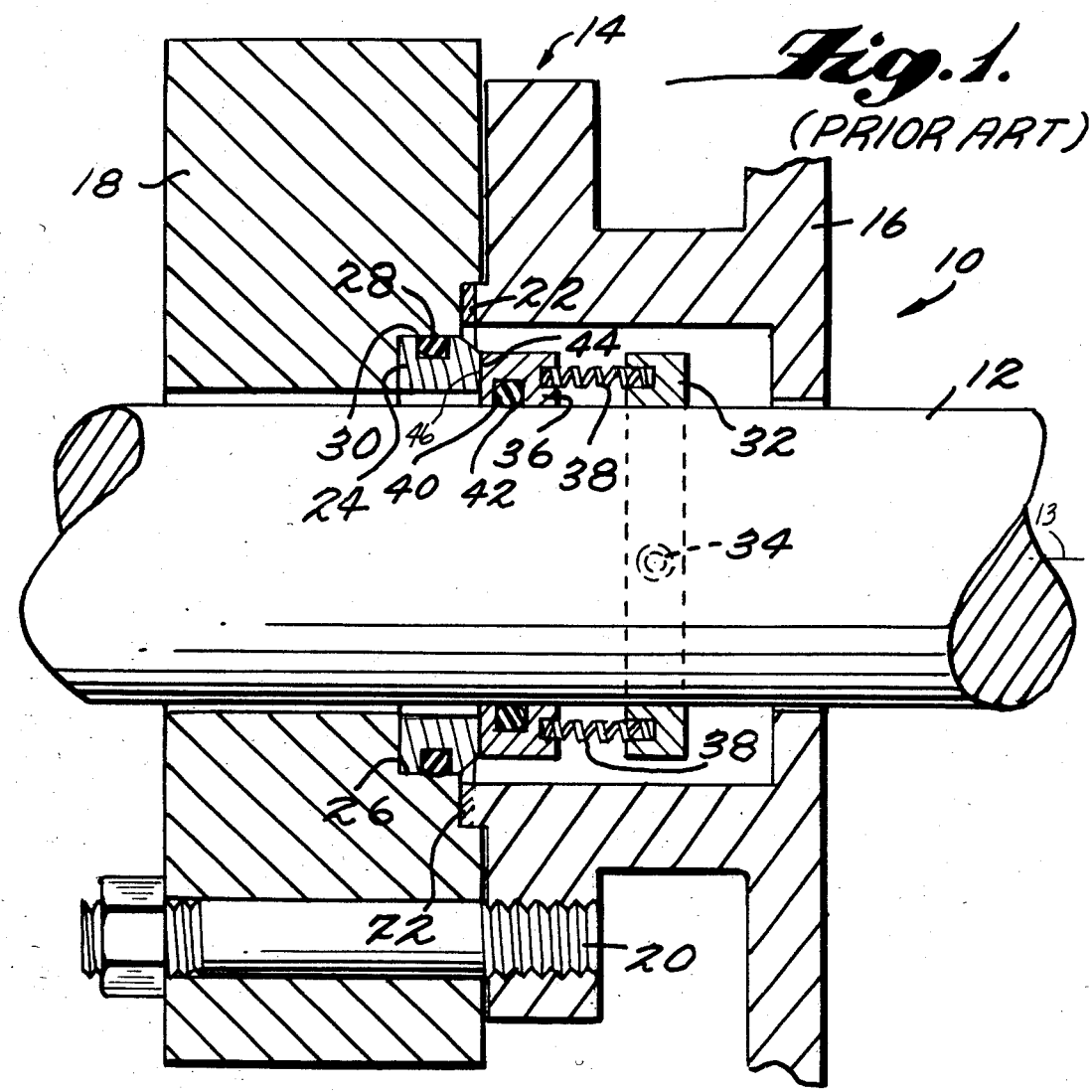
FIG. 1 is a view, partly in cross section, of a prior art seal assembly.

With reference now to the drawings, wherein like reference characters designate like or corresponding parts throughout the several views, there is shown in FIG. 1 a prior art seal assembly 10 which is used to provide a seal around rotating shaft 12. Shaft 12 passes through housing 14, which is comprised of stuffing box 16 and gland 18. Gland 18 is typically fastened to stuffing box 16 by bolts 20, and gasket 22 provides a seal between stuffing box 16 and gland 18. A stationary sealing member or insert 24 is held within rabbet 26 of gland 18, and O-ring 28 within cavity 30 of insert 24 enhances the sealing of member 24.

Inside stuffing box 16 is located an assembly which rotates with shaft 12. This assembly consists of first ring member 32 which is held in position on shaft 12 by set screws 34 or other conventional means. Annular sealing member 36 is positioned around shaft 12, and springs 38 are connected between ring member 32 and sealing member 36 to yieldingly urge sealing member 36 against sealing member 24. O-ring 40 is positioned within cavity 42 of sealing member 36 to provide a fluid-tight seal with shaft 12.

In operation of the prior art assembly illustrated in FIG. 1, sealing member 36 and O-ring 40 must move or oscillate on shaft 12 as the shaft rotates if sealing member 24 is not perfectly positioned with its sealing face 44 perpendicular to axis 13 of the shaft. If sealing face 44 of sealing member 24 is not perfectly perpendicular to the axis of shaft 12, sealing member 36 must oscillate as it rotates with the shaft to keep its sealing face 46 in fluid-tight and sealing contact with sealing face 44. As sealing member 36 oscillates, O-ring 40 also oscillates along the surface of shaft 12. Such oscillation of O-ring 40 wears the outer surface of shaft 12, and this wear is called fretting. In time the wear can result in leakage of oil past O-ring 40, and such oscillation of sealing member 36 may result in the formation of a poor seal between sealing faces 44 and 46. Increased wear of sealing faces 44 and 46 may also result.

Desired operation of the prior art assembly illustrated in FIG. 1 could be achieved if sealing member or insert 24 could be properly aligned at all times with its sealing face 44 perpendicular to axis 13 of shaft 12. Practice, however, has proven this to be difficult if not impossible to achieve. If, for example, insert 24 is initially properly positioned before rotation of the shaft is initiated, normal distortion of the shaft as the shaft rotates will result in the undesired misalignment of insert 24. Such normal distortion of the shaft is caused by the weight or head pressure of fluid on the pump impeller (not shown) which is attached to shaft 12.

A so-called bellows seal assembly (not shown) has been developed which eliminates the problem of fretting. One example of such a bellows type mechanical seal is described in U.S. Pat. No. 4,136,887. However, bellows seal assemblies are expensive, and the lifetime of bellows seal assemblies are limited because of the tendency of the bellows to work-harden and fail.

With reference now to FIGS. 2-3 there is shown an improved mechanical seal assembly 10' in accordance with this invention. A first ring member 32' is attached to shaft 12 by set screws 34' or other conventional means, and ring member 32' is rotatable with shaft 12. A first annular seal member 36' is positioned in fluid-tight contact around shaft 12, and seal member 36' also rotates with shaft 12. Springs 38' are yieldingly connected between ring member 32' and seal member 36'. A second annular seal member 24' is positioned within rabbet 48' of gland 18', and seal member 24' is located in spaced relationship from and around shaft 12 in fluid-tight relationship with gland 18' and with first seal member 36'.

In accordance with the invention, flowable material filled means 50 are in operative relationship with gland 18' and with second seal member 24' for cooperating with seal member 36' to enable second member 24' to be maintained in a predetermined orientation with respect to shaft 12 whereby sealing face 44' of seal member 24' is maintained perpendicular to central longitudinal axis 13 of shaft 12.

Flowable material filled means 50 include a second ring member 52 press fit and held in position around shaft 12 and within rabbet 48' by gland 18'. Second ring member 52 defines an annular cavity 54, and cavity 54 also surrounds shaft 12. A third annular seal member 56 is movably positioned within annular cavity 54 in fluid-sealing contact with second ring member 52 to form a fluid-tight space 57 within annular cavity 54. A flowable material 58 without a memory fills the fluid-tight space, and the material may include a fluid or other flowable material without a memory, such as glass or other solid material ground to a fine powder. A third ring member 60 is movably positioned within annular cavity 54 with third seal member 56 between flowable material 58 and third ring member 60. Third ring member 60 projects outwardly from annular cavity 54 and beyond margin 62 of second ring member 52. Second annular seal member 24' is in contact with third ring member 60 and in fluid-sealing contact with first sealing member 36'. Faces 44' and 46' of sealing members 46' and 36' are urged into fluid-tight relationship with each other by springs 38' which yieldingly urge first seal member 36' against second seal member 24'.

Second seal member 24' defines a cavity 64 therein and includes a fourth annular seal member 66 positioned within cavity 64 and in fluid-sealing contact with gland 18. Similarly, first seal member 36' defines a cavity 68 therein and includes a fifth annular seal member 70 positioned within cavity 68 and in fluid-sealing contact with shaft 12.

In operation of the improved seal assembly illustrated in FIGS. 2-3 flowable material 58 will enable second seal member 24' to "float" so that face 44' is maintained in a plane perpendicular to axis 13 of shaft 12. As sealing face 46' of first seal member 36' is rotated with shaft 12 against sealing face 46' of second seal member 24', the orientation of seal member 24' will be altered to permit sealing face 44' to be maintained in a perpendicular plane to axis 13. Such movement of seal 24' is permitted by the flowable characteristics of material 58 in cooperation with associated movements of seal member 56 and ring member 60. As a result, seal member 36' will not move or oscillate along shaft 12, and O-ring or seal member 70 will not wear or fret shaft 12.

Figure 5:
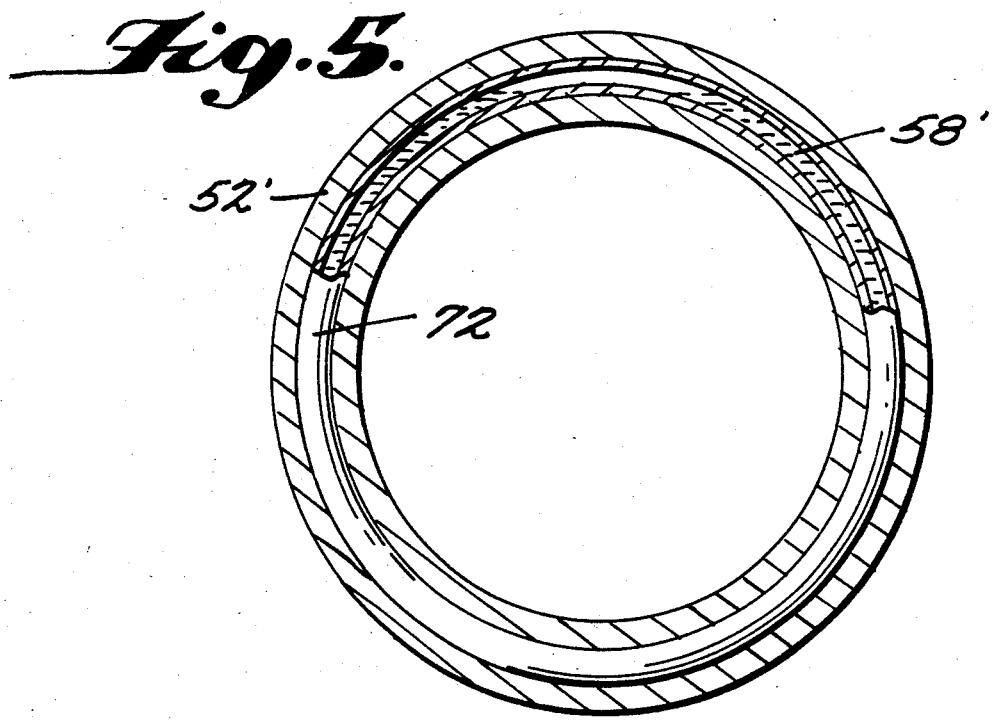
FIG. 5 is a cross-sectional view taken along the line 5—5 in FIG. 4 and looking in the direction of the arrows.

An alternative embodiment of this invention is illustrated in FIGS. 4-5 wherein flowable material filled means 50' include a second ring member 52' held in position within rabbet 48' around shaft 12 and within gland 18'. Ring member 52' defines an annular cavity 54' which also surrounds shaft 12. A hollow O-ring 72 is positioned within annular cavity 54', and a flowable material 58' partially fills the interior of O-ring 72. A third ring member 60' is movably positioned within annular cavity 54' and is located between O-ring 72 and second seal member 24'. Third ring member 60' projects outwardly from annular cavity 54' and beyond margin 62' of second ring member 52'. Second seal member 24' is in contact with third ring member 60' and is in fluid-sealing contact with first seal member 36', as previously described.

In operation of the embodiment illustrated in FIGS. 4-5, the desired orientation of sealing face 44' of seal member 24' is maintained by the flowable characteristics of material 58' within O-ring 72 acting in cooperation with movements of the flexible walls of O-ring 72 and of third ring member 60'. As in the previously described embodiment, flowable material 58' can be a fluid or other flowable material without a memory such as glass or other solid material ground to a fine powder.

The invention in its broader aspects is not limited to the specific details shown and described, and departures may be made from such details without departing from the principles of the invention and without sacrificing its chief advantages.

What is claimed is:

1. A mechanical seal assembly for use with a rotatable shaft passing through a housing, said seal assembly comprising:
   a first ring member attached to and rotatable with said shaft:
   a first annular seal member positioned in fluid-tight contact around and rotatable with said shaft:
   at least one spring member yieldingly connected between said ring member and said seal member;
   a second annular seal member positioned within said housing in spaced relationship from and around said shaft and in fluid-tight relationship with said housing and with said first seal member; and
   flowable material filled means in operative relationship with said housing and with said second seal member for cooperating with said first seal member to enable said second seal member to be maintained in a predetermined orientation with respect to said shaft.

2. A seal assembly as in claim 1 wherein said housing defines a rabbet therein and wherein said flowable material filled means include:
   a second ring member held in position within said rabbet by said housing and around said shaft, said second ring member defining an annular cavity surrounding said shaft;
   a third annular seal member movably positioned within said annular cavity and in fluid-sealing contact with said second ring member to form a fluid-tight space within said annular cavity;
   a flowable material filling said fluid-tight space;
   a third ring member movably positioned within said annular cavity with said third seal member between said flowable material and said third ring member, said third ring member projecting outwardly from said annular cavity and beyond the margins of said second ring member; and
   said second annular seal member in contact with said third ring member and in fluid-sealing contact with said first seal member.

3. A seal assembly as in claim 2 wherein said second seal member defines a cavity therein and includes a fourth annular seal member positioned within said cavity in fluid-sealing contact with said housing.

4. A seal assembly as in claim 3 wherein said first annular seal member defines a cavity therein and includes a fifth annular seal member positioned within said last-mentioned cavity in fluid-sealing contact with said shaft.

5. A seal assembly as in claim 4 wherein said flowable material is a fluid.

6. A seal assembly as in claim 4 wherein said flowable material is a powdered solid material.

7. A seal assembly as in claim 6 wherein said flowable material is powdered glass.

8. A seal assembly as in claim 1 wherein said housing defines a rabbet therein and wherein said flowable material filled means include:
   a second ring member held in position within said rabbet by said housing and around said shaft, said second ring member defining an annular cavity surrounding said shaft;
   a hollow, O-ring positioned within said annular cavity;
   a flowable material partially filling said hollow O-ring;
   a third ring member movably positioned within said annular cavity between said O-ring and said second seal member, said third ring member projecting outwardly from said annular cavity and beyond the margins of said second ring member;
   said second annular seal member in contact with said third ring member and in fluid-sealing contact with said first seal member.

9. A seal assembly as in claim 8 wherein said second seal member defines a cavity therein and includes a fourth annular seal member positioned within said cavity in fluid-sealing contact with said housing.

10. A seal assembly as in claim 9 wherein said first annular seal member defines a cavity therein and includes a fifth annular seal member positioned within said last-mentioned cavity in fluid-sealing contact with said shaft.

11. A seal assembly as in claim 10 wherein said flowable material is a fluid.

12. A seal assembly as in claim 10 wherein said flowable material is a powdered solid material.

13. A seal assembly as in claim 12 wherein said flowable material is powdered glass.

* * * * *